United States Patent [19]

Lummus

[11] 4,084,868
[45] Apr. 18, 1978

[54] MOVING DISPLAY RACK

[76] Inventor: J. Frank Lummus, 1232 Grove Park La., Columbia, S.C. 29210

[21] Appl. No.: 771,893

[22] Filed: Feb. 25, 1977

[51] Int. Cl.² .......................... A47F 3/08; A47B 49/00
[52] U.S. Cl. ...................................... 312/268; 312/97; 312/134
[58] Field of Search .................. 312/268, 97, 134, 135

[56] References Cited

U.S. PATENT DOCUMENTS

| 962,749 | 6/1910 | Davis | 312/268 |
|---|---|---|---|
| 1,938,985 | 12/1933 | Starr | 312/268 |
| 2,512,684 | 6/1950 | Shontz, Jr. | 312/268 |
| 2,935,367 | 5/1960 | Crawford | 312/268 |
| 3,883,203 | 5/1975 | Lexe | 312/268 |

Primary Examiner—Paul R. Gilliam
Assistant Examiner—Victor N. Sakran
Attorney, Agent, or Firm—Daniel Jay Tick

[57] ABSTRACT

A plurality of trays are supported on bars affixed to and extending between a pair of endless carrier chains. The carrier chains are mounted on sprocket wheels which are rotated to move the carrier chains through a cabinet and past a window in the cabinet. Each of the trays is removably rotatably mounted on a corresponding one of the bars. Each of the trays has a box-like configuration with an open front facing the window, a spring-biased retainer device for retaining an item in the tray, and a guide device for maintaining the tray upright in its journey through the cabinet.

1 Claim, 7 Drawing Figures

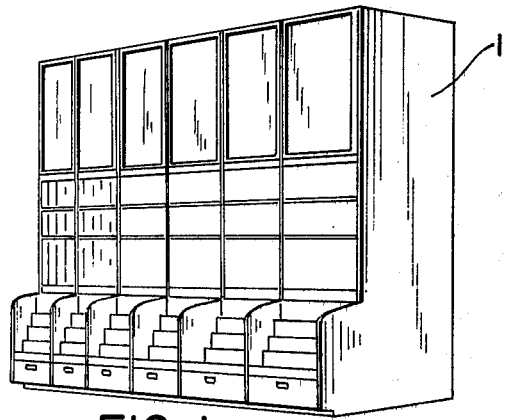
FIG. I
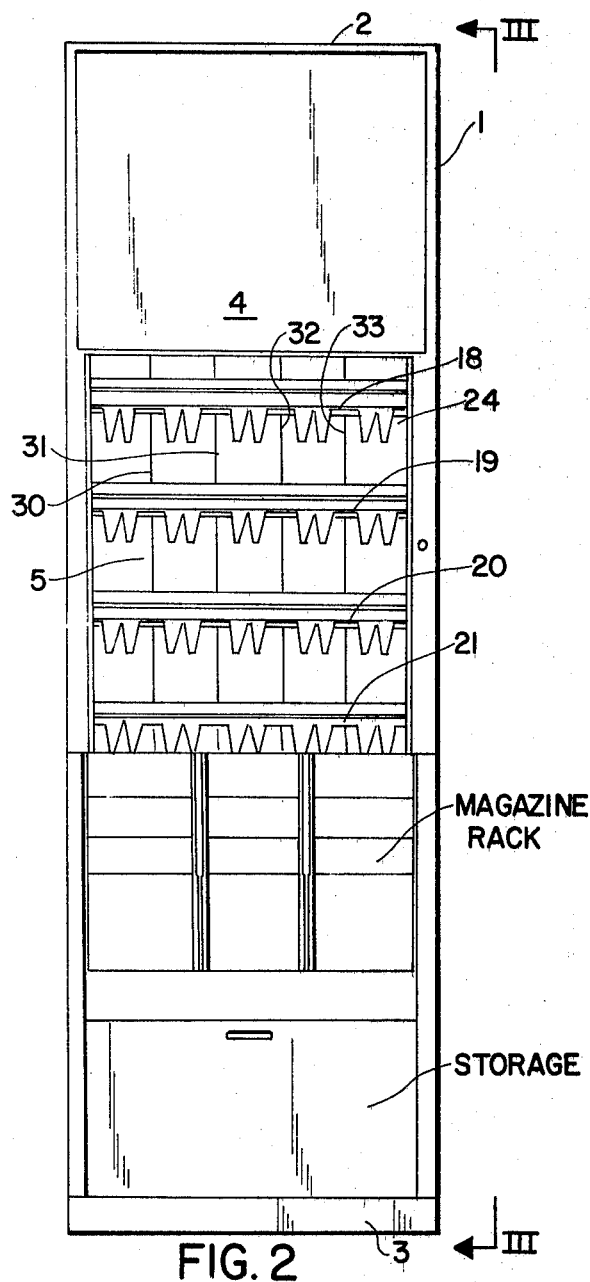
FIG. 2
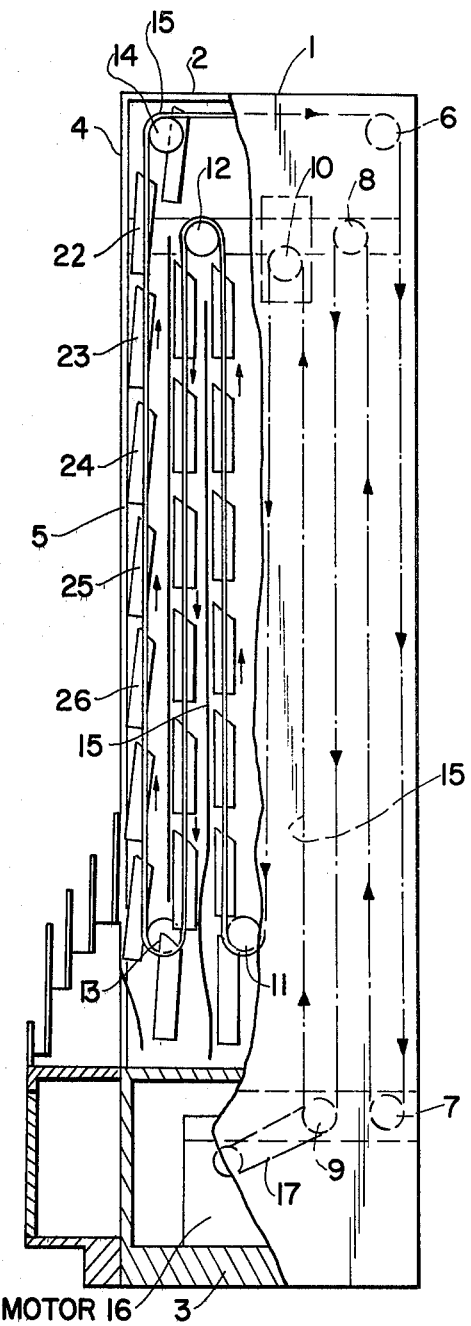
FIG. 3

MOVING DISPLAY RACK

BACKGROUND OF THE INVENTION

The present invention relates to a moving display rack.

Objects of the invention are to provide a moving display rack of simple structure, which is inexpensive in manufacture, used with facility and convenience, and functions efficiently, effectively and reliably to display the maximum number of items in a minimum period of time and in a compact area, in a pleasant and attractive manner for the inspection of potential customers. The items displayed are preferably books, and the like, although they may be any suitable consumer items.

BRIEF DESCRIPTION OF THE DRAWINGS

In order that the invention may be readily carried into effect, it will now be described with reference to the accompanying drawings, wherein:

FIG. 1 is a perspective view of a plurality of the cabinets of the moving display rack of the invention;

FIG. 2 is a front view, on an enlarged scale, of an embodiment of the cabinet of the moving display rack of the invention;

FIG. 3 is a view, taken along the lines III—III, and partly cut away, of FIG. 2;

FIG. 7 is a side view of the tray of FIG. 6 with its side plate affixed thereto.

DETAILED DESCRIPTION OF THE INVENTION

Figure 4:
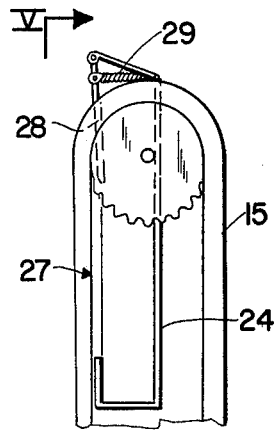
FIG. 4 is a schematic diagram representing a tray and part of the carrier chain assembly of the moving display rack of the invention.

The moving display rack of the invention comprises a cabinet 1 (FIGS. 1, 2, 3) having a top 2 and a bottom 3 (FIGS. 2 and 3). A side 4 extends between the top 2 and the bottom 3 (FIGS. 2 and 3). A display window 5 is provided in the side 4.

A plurality of pairs of sprocket wheels are rotatably mounted in the cabinet 1 with the wheels of each pair spaced from each other in substantially parallel relation. Thus, only a single sprocket wheel 6, 7, 8, 9, 10, 11, 12, 13, and 14 of each pair of sprocket wheels is shown in the view of FIG. 3. Approximately half the pairs of sprocket wheels 6, 8, 10, 12, 14, and their corresponding mates (not shown in the FIGS.), are mounted in the area of the top of the cabinet 1. The remaining pairs of sprocket wheels 7, 9, 11, 13, and their corresponding mates (not shown in the FIGS.), are mounted in the area of the bottom of the cabinet 1.

A pair of endless carrier chains are provided. One of the carrier chains 15 (FIGS. 3 and 4) is mounted on one of the sprocket wheels 6 to 14 of each pair of sprocket wheels and extends between the sprocket wheels in meandering fashion. The other carrier chain (not shown in the FIGS.) is mounted on the remaining sprocket wheels of each pair of sprocket wheels and extends between such remaining sprocket wheels in meandering fashion in the same manner as the carrier chain 15. The second carrier chain is thus mounted on a sprocket wheel of the pair of which the sprocket wheel 6 is one, a sprocket wheel of the pair of which the sprocket wheel 7 is one, a sprocket wheel of the pair of which the sprocket wheel 8 is one, and so on.

A motive device such as, for example, a motor 16 (FIG. 3) is coupled to a selected pair of the sprocket wheels 9 and the other sprocket wheel of the pair (not shown in the FIGS.) via suitable coupling or driving means such as a drive belt 17 (FIG. 3). The motor 16 rotates the sprocket wheels and moves the carrier chains through the cabinet 1 and past the window 5 of said cabinet in a predetermined direction. In the illustrated example of FIG. 3, the carrier chains move upward past the window 5 in the cabinet 1. The movement of the carrier chains is illustrated in direction in FIG. 3 by a plurality of arrowheads.

A plurality of bars, rods, or the like, 18, 19, 20, 21, and so on (FIG. 2), are affixed to the pair of carrier chains and extend therebetween substantially perpendicularly thereto in equidistantly spaced relation.

A plurality of trays 22, 23, 24, 25, 26, an so on (FIG. 3), support items such as, for example, paperback books, to be displayed. Each of the trays 22 to 26, and so on, is removably rotatably mounted on a corresponding one of the bars. Thus, as shown in FIGS. 2, 6 and 7, the tray 24 is removably rotatably mounted on the bar 18.

Figure 5:
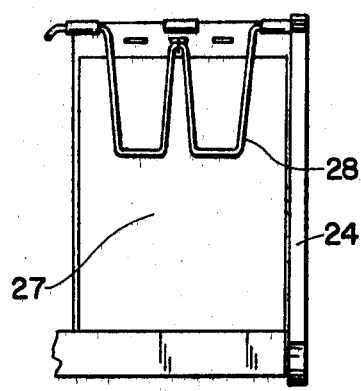
FIG. 5 is a view, taken along the lines V—V, of FIG. 4.
Figure 6:
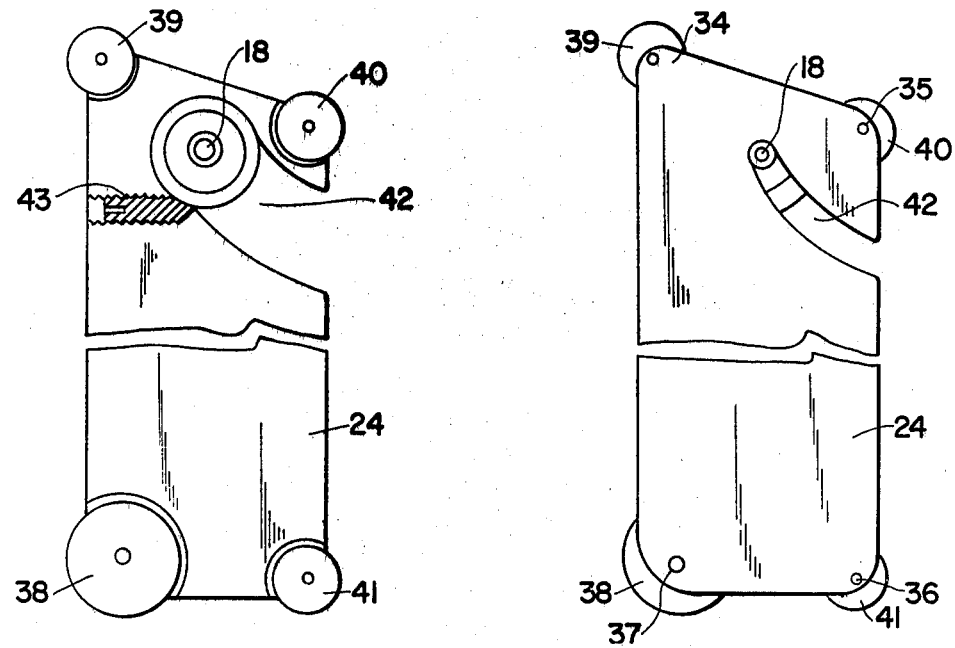
FIG. 6 is a side view, on an enlarged scale, of an embodiment of a tray of the moving display rack of the invention.

Each of the trays 22 to 26, and so on, has a box-like configuration, as shown in FIGS. 4 to 6, with an open front 27 (FIGS. 4 and 5) facing the window 5 of the cabinet 1. A retainer device 28 (FIGS. 4 and 5) is biased by a spring 29 (FIG. 4) for retaining an item displayed in the tray in said tray. The retainer device comprises a movably mounted wire bent in the shape of a W.

A plurality of pairs of guide strips of magnetizable material 30, 31, 32, 33, and so on, are provided in the cabinet 1 in the area of the window 5 thereof. Each of the trays 22 to 26, and so on, has a guide device for maintaining the tray upright in its journey through the cabinet 1. Each of the trays 22 to 26, and so on, has eight corners. The tray 24 thus has corners 34, 35, 36 and 37, as shown in FIG. 7, and an additional four corners not shown in the FIGS., but opposite each of the corners 34 to 37.

The guide device of each tray comprises a pair of magnetic guide wheels rotatably mounted on the bottom front corners for rotating on the guide strips and a plurality of cushion wheels each rotatably mounted on a corresponding one of the remaining corners. The magnetic guide wheel 38 of the tray 24 mounted on the bottom front on a bottom front corner 37 is shown in FIGS. 6 and 7. The other magnetic guide wheel of the tray 24 is not shown in the FIGS. The cushion wheels 39, 40 and 41 mounted on the corners 34, 35 and 36, respectively, of the tray 24, are shown in FIGS. 6 and 7. The remaining three cushion wheels are not shown in the FIGS.

Each of the trays has an upwardly sloping, slightly arcuate slot formed therethrough from the rear thereof toward the front thereof so that the tray may be slipped onto a bar or rod of the rack. The slot 42 of the tray 24 is shown in FIGS. 6 and 7.

A locking screw is threadedly secured in each of the trays 22 to 26 to secure the tray to the bar or rod on which it is supported. The locking screw 43 of the tray 24 is shown in FIG. 6.

While the invention has been described by means of a specific example and in a specific embodiment, I do not wish to be limited thereto, for obvious modifications will occur to those skilled in the art without departing from the spirit and scope of the invention.

I claim:
1. A moving display rack, comprising
   a cabinet having a top, a bottom, a side extending between the top and bottom and a display window in the side;
   a plurality of pairs of sprocket wheels rotatably mounted in the cabinet with the wheels of each pair spaced from each other in substantially parallel relation and approximately half the pairs of sprocket wheels being mounted in the area of the top of the cabinet and the remaining pairs of sprocket wheels being mounted in the area of the bottom of the cabinet;
   a pair of endless carrier chains each mounted on a corresponding one of the sprocket wheels of each pair of sprocket wheels and extending between the sprocket wheels in meandering fashion;
   motive means coupled to a selected pair of the sprocket wheels for rotating the sprocket wheels and moving the carrier chains through the cabinet and past the window of the cabinet in a predetermined direction;
   a plurality of bars affixed to the pair of carrier chains and extending therebetween substantially perpendicularly thereto in equidistantly spaced relation;
   a plurality of trays for supporting items to be displayed, each of the trays being removably rotatably mounted on a corresponding one of the bars, each of the trays having a box-like configuration with an open front facing the window, a spring-biased retainer device for retaining an item in the tray and guide means for maintaining the tray upright in its journey through the cabinet; and
   a plurality of pairs of guide strips of magnetizable material in the cabinet in the area of the window, each of the trays having eight corners and the guide means of each tray comprising a pair of magnetic guide wheels rotatably mounted on the bottom front corners for rotating on the guide strips and a plurality of cushion wheels each rotatably mounted on a corresponding one of the remaining corners.

* * * * *